(12) United States Patent
Yeh

(10) Patent No.: US 8,044,848 B2
(45) Date of Patent: Oct. 25, 2011

(54) HIGH-SPEED POSITIONING SYSTEM AND METHOD

(75) Inventor: Chun-Nan Yeh, Nantou (TW)

(73) Assignee: Mitac International Corp., Taipei (TW)

( * ) Notice: Subject to any disclaimer, the term of this patent is extended or adjusted under 35 U.S.C. 154(b) by 340 days.

(21) Appl. No.: 12/175,875

(22) Filed: Jul. 18, 2008

(65) Prior Publication Data

US 2009/0021426 A1 Jan. 22, 2009

(30) Foreign Application Priority Data

Jul. 20, 2007 (TW) .............................. 96126700 A

(51) Int. Cl.
*G01S 19/06* (2010.01)
(52) U.S. Cl. ................................................. 342/357.43
(58) Field of Classification Search ............. 342/357.43, 342/357.64
See application file for complete search history.

(56) References Cited

U.S. PATENT DOCUMENTS

| | | | | |
|---|---|---|---|---|
| 6,222,483 | B1 * | 4/2001 | Twitchell et al. | 342/357.43 |
| 6,587,789 | B2 * | 7/2003 | van Diggelen | 342/357.43 |
| 6,768,452 | B2 | 7/2004 | Gilkes | |
| 7,427,951 | B2 | 9/2008 | Kuo et al. | |
| 2002/0175855 | A1 * | 11/2002 | Richton et al. | 342/357.02 |
| 2004/0119639 | A1 | 6/2004 | Gilkes | |
| 2006/0038719 | A1 | 2/2006 | Pande et al. | |
| 2007/0096981 | A1 * | 5/2007 | Abraham | 342/357.09 |
| 2007/0182631 | A1 * | 8/2007 | Berlinsky et al. | 342/357.15 |
| 2007/0293243 | A1 | 12/2007 | Shyr et al. | |

FOREIGN PATENT DOCUMENTS

| | | |
|---|---|---|
| TW | 200502566 | 1/2005 |
| TW | 200644468 | 12/2006 |
| TW | 200713148 | 4/2007 |
| TW | 200722780 | 6/2007 |

* cited by examiner

*Primary Examiner* — Thomas Tarcza
*Assistant Examiner* — Fred H Mull
(74) *Attorney, Agent, or Firm* — Kirton & McConkie; Evan R. Witt

(57) ABSTRACT

A high-speed positioning system includes a server and a positioning device. The server links to Internet for receiving and interpreting GPS signals received from a satellite system. The positioning device includes a network connecting module, a user position information generator and a satellite positioning module. The network connecting module is in communication with a connecting node of Internet for receiving a connecting node information. The user position information generator generates a user position information according to the connecting node information. The user position information is transmitted to the server through Internet. A satellite position signal is generated by the server according to the user position information and sent back to the user position information generator through Internet. The satellite positioning module is in communication with the network connecting module for receiving the satellite position signal and executing a positioning operation according to the contents of the satellite position signal.

13 Claims, 9 Drawing Sheets

US 8,044,848 B2

HIGH-SPEED POSITIONING SYSTEM AND METHOD

FIELD OF THE INVENTION

The present invention relates to a high-speed positioning system and a high-speed positioning method, and more particularly to a high-speed positioning system and a high-speed positioning method for use with a global positioning system (GPS).

BACKGROUND OF THE INVENTION

A global positioning system (GPS) has been widely employed in many applications. For example, GPS can be used in vehicle navigation systems, personal locaters, aviation and the like. By using GPS together with an electronic map (E-map), a navigation system can precisely locate its carrier such as a vehicle or a hiker and program a proper route for further advancement or facilitate searching and rescuing tasks.

FIG. 1 is a schematic diagram illustrating a typical global positioning system. A positioning device 10 receives GPS signals from three or more GPS satellites 111~11n orbiting the earth 12 and determines a position of the carrier carrying the positioning device 10 in a two-dimensional or three-dimensional coordinate system according to the GPS signals by way of triangulation.

When the positioning device 10 is turned on, previously stored almanac and ephemeris data, current time and last-identified location are checked. The almanac and ephemeris data provides estimated information of currently available satellites and locations of these satellites relative to current time and the last-identified location. The positioning device 10 then locks the currently available satellites instead of inefficiently searching satellites in the sky. If the almanac and ephemeris data are out of date or lost, the searching of GPS satellites cannot be performed smoothly. Therefore, for rapidly locating available satellites and precisely acquiring GPS signals, the almanac and ephemeris data stored in the positioning device 10 should be frequently updated.

Alternatively, in Assisted GPS (or AGPS), the almanac and ephemeris data and the temporal and spatial data are received from a base station of a mobile-phone network system. It is advantageous in reducing the positioning time and extending the covering range indoors.

FIG. 2 is a schematic functional block diagram illustrating a typical Assisted GPS. In the Assisted GPS, an A-GPS server 21 is built in a mobile-phone network 20 at such a proper position that a satellite signal receiver 210 of the AGPS server 21 can receive high-quality GPS signals from the GPS satellites 221~22n. When a mobile phone 29 with the AGPS positioning function validly links to a base station 201 of the mobile-phone network 20, the AGPS server 21 identifies the Cell ID of the base station 201, finds an area where the mobile phone 29 is located according to the Cell ID and associated tables of the base station 201, and then transmits almanac and ephemeris data corresponding to the satellites in the area to the mobile phone 29 via the mobile-phone network 20. In comparison with conventional global positioning systems, the Assisted GPS accelerates the positioning operation and improves the positioning precision. Furthermore, the precise position information of the mobile phone 29 can be fed back to the AGPS server 21 via the mobile-phone network 20, thereby achieving a location-based service (LBS).

Since the AGPS server 21 cannot execute the positioning function without the aid of the mobile-phone network 20 for offering associated services of the Assisted GPS, it is critical to look for support from the mobile-phone service operator of the mobile phone network 20. Once the mobile-phone network 20 covers a variety of mobile-phone systems, e.g. the mobile-phone subscriber is roaming in a foreign region beyond the coverage of the contract operator, the above mechanism does not work. The highly dependence of the conventional AGPS on a mobile-phone network renders the entire system uncertain.

SUMMARY OF THE INVENTION

The present invention provides a high-speed positioning system and a high-speed positioning method for quickly and precisely searching GPS signals without the assistance of any mobile phone service operator.

In accordance with an aspect of the present invention, there is provided a high-speed positioning system. The high-speed positioning system includes a server and a positioning device. The server links to Internet for receiving and interpreting GPS signals received from a satellite system. The positioning device includes a network connecting module, a user position information generator and a satellite positioning module. The network connecting module is in communication with a connecting node of Internet for receiving a connecting node information. The user position information generator is in communication with the network connecting module for generating a user position information according to the connecting node information. The user position information is transmitted to the server through Internet. An assisted satellite position signal is generated by the server according to the user position information and sent back to the user position information generator through Internet. The satellite positioning module is in communication with the network connecting module for receiving the assisted satellite position signal and executing a positioning operation according to the contents of the assisted satellite position signal.

The present invention further provides another high-speed positioning system. The high-speed positioning system includes a server and a positioning device. The positioning device includes a network connecting module and a satellite positioning module. The network connecting module is in communication with a connecting node of Internet for receiving a connecting node information. The connecting node information is transmitted to the server through Internet. A satellite position signal is generated from the server according to the connecting node information. The satellite positioning module is in communication with the network connecting module for receiving the assisted satellite position signal and executing a positioning operation according to the contents of the assisted satellite position signal.

In accordance with another aspect of the present invention, there is provided a high-speed positioning device for use with a server and Internet. The high-speed positioning device includes a network connecting module, a user position information generator and a satellite positioning module. The network connecting module is in communication with a connecting node of Internet for receiving a connecting node information. The user position information generator is in communication with the network connecting module for generating a user position information according to the connecting node information. The user position information is transmitted to the server through Internet. An assisted satellite position signal is generated by the server according to the user position information and sent back to the user position information generator through Internet. The satellite positioning module is in communication with the network connecting module for receiving the assisted satellite position signal and executing a positioning operation according to the contents of the assisted satellite position signal.

The present invention further provides a high-speed positioning device for use with a server and Internet. The high-speed positioning device includes a network connecting module and a satellite positioning module. The network connecting module is in communication with a connecting node of Internet for receiving a connecting node information. The connecting node information is transmitted to the server through Internet. An assisted satellite position signal is generated from the server according to the connecting node information. The satellite positioning module is in communication with the network connecting module for receiving the assisted satellite position signal and executing a positioning operation according to the contents of the assisted satellite position signal.

In accordance with another aspect of the present invention, there is provided a high-speed positioning method. The high-speed positioning method includes steps of allowing a server to receive and interpret the GPS signals received from a satellite system, allowing a positioning device to communicate with Internet through a connecting node to receive connecting node information, generating user position information according to the connecting node information, generating an assisted satellite position signal from the server according to the user position information, and receiving the assisted satellite position signal by the positioning device and executing a positioning operation according to the contents of the assisted satellite position signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
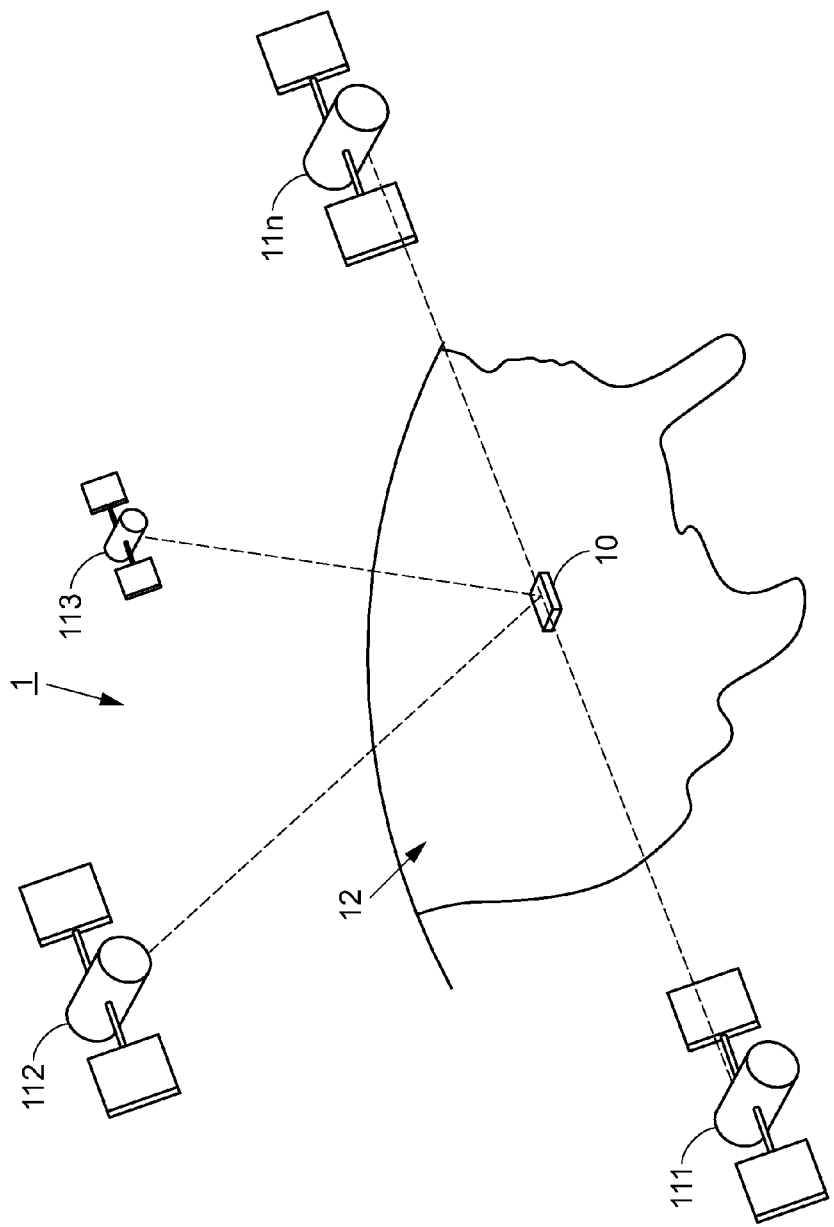
FIG. 1 is a schematic diagram illustrating a typical global positioning system.
Figure 2:
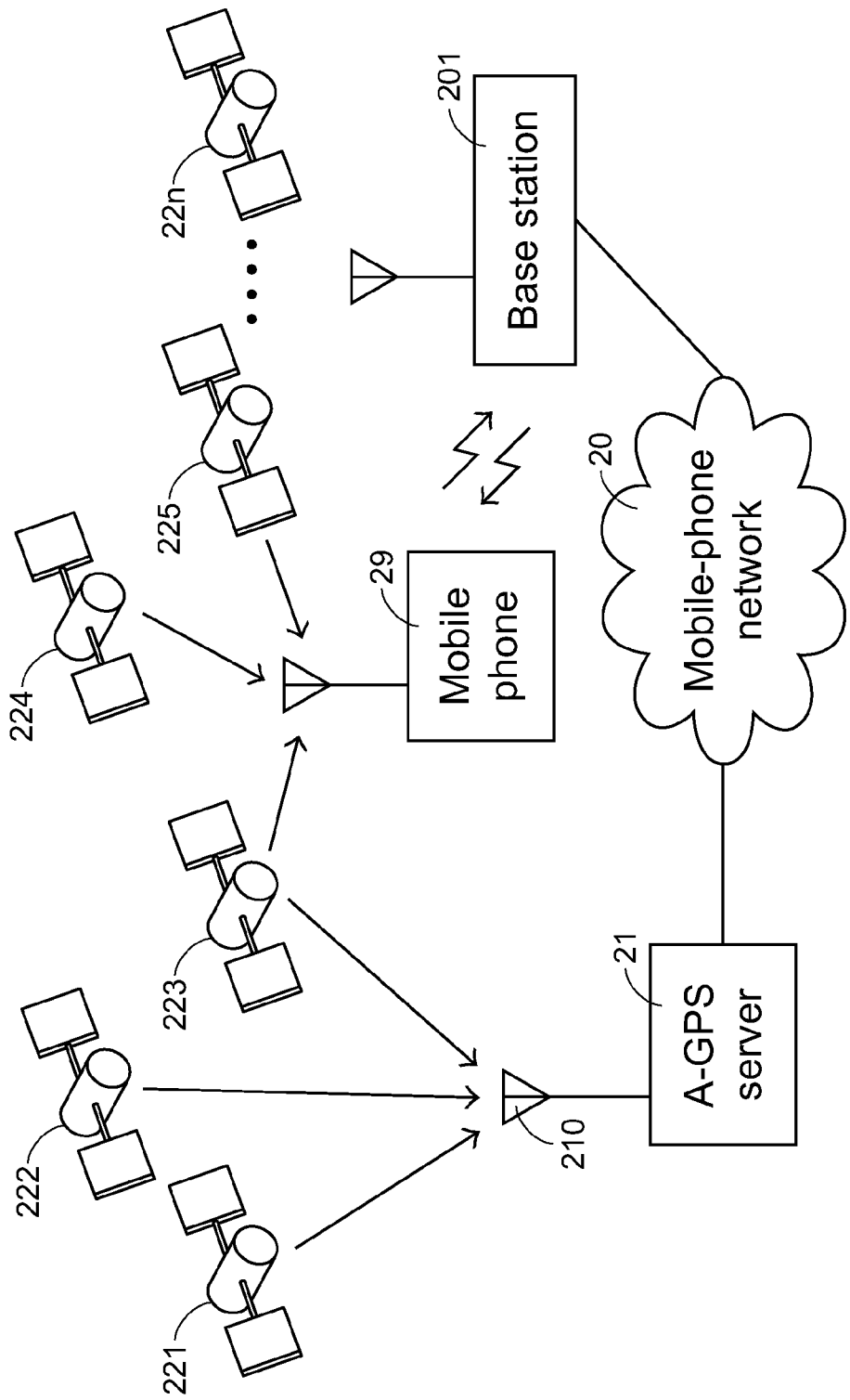
FIG. 2 is a schematic diagram illustrating a typical Assisted GPS.
Figure 3:
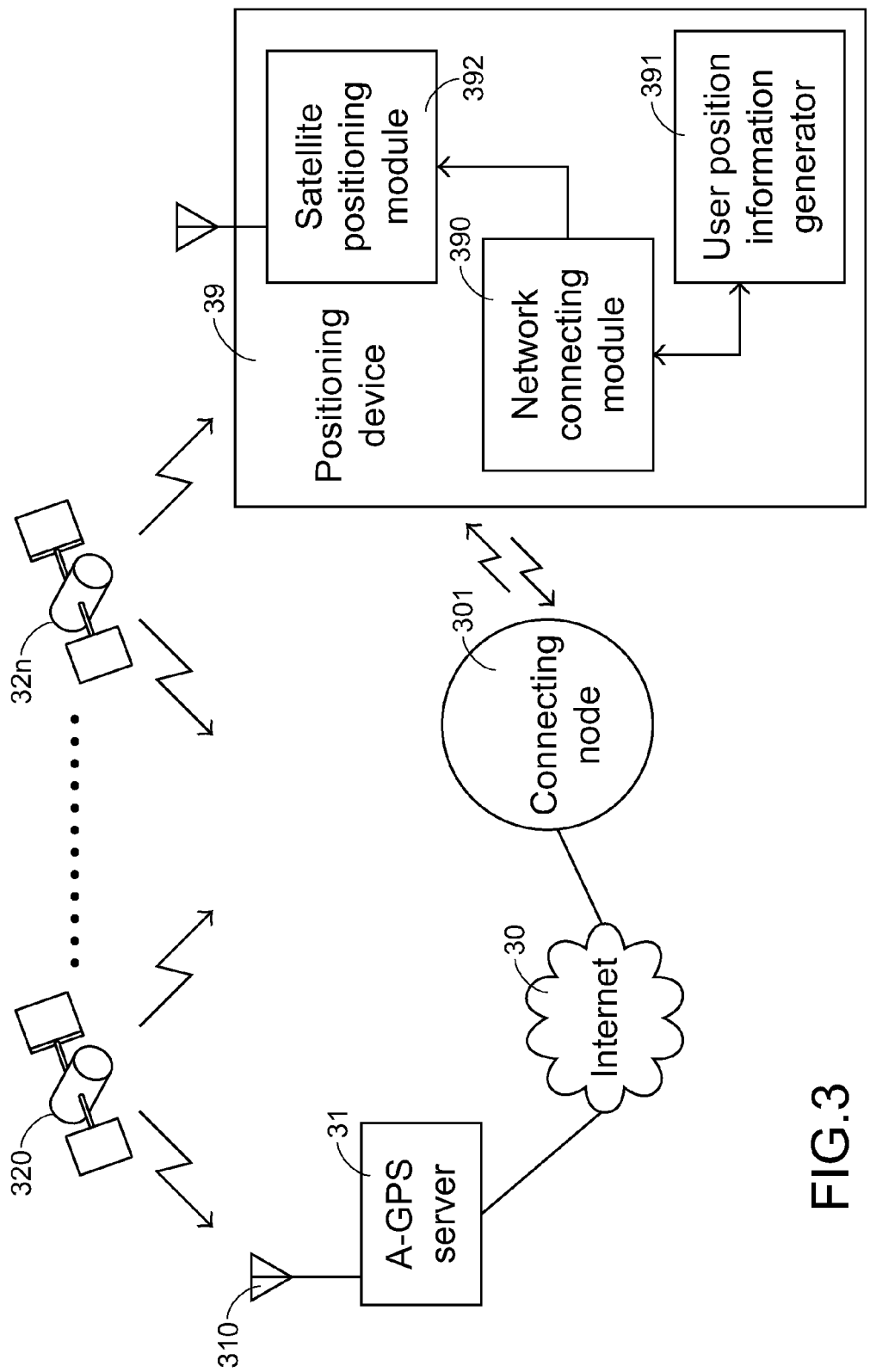
FIG. 3 is a schematic diagram illustrating a high-speed positioning system according to an embodiment of the present invention.

A high-speed positioning system according to an embodiment of the present invention is shown in FIG. 3. The high-speed positioning system includes an assisted GPS (AGPS) server 31, a positioning device 39 and a plurality of satellites 320~32n. The AGPS server 31 links to Internet 30 and includes a satellite signal receiver 310. The location of the AGPS server 31 is selected such that high-quality GPS signals can be received from some of the GPS satellites 320~32n via the satellite signal receiver 310 so as to acquire the latest updated satellite position data (e.g. almanac and ephemeris data). The positioning device 39 includes a network connecting module 390, a user position information generator 391 and satellite positioning module 392. While the network connecting module 390 is coupled to a connecting node 301 of Internet 30, the positioning device 39 obtains connecting node information associated with the connecting node 301. According to the connecting node information, corresponding user position information is generated by the user position information generator 391 of the positioning device 39. Through Internet 30, the user position information is transmitted to the AGPS server 31. According to the user position information and the updated satellite position data (e.g. almanac and ephemeris data), the AGPS server 31 generates and outputs an assisted satellite position signal to the positioning device 39. According to the contents of the assisted satellite position signal, the satellite positioning module 392 of the positioning device 39 searches currently available GPS satellites to achieve the object of high-speed positioning.

Figure 4A:
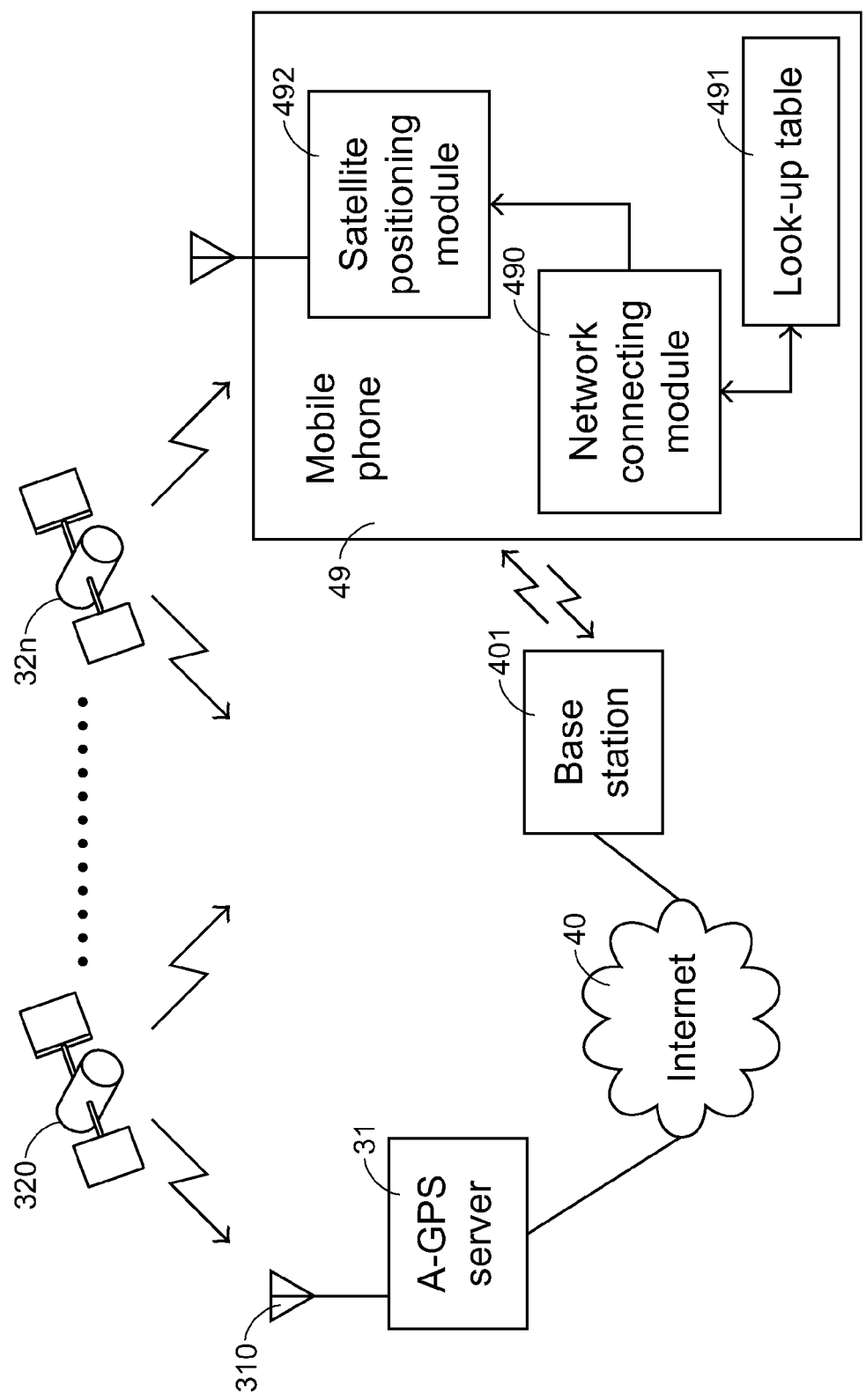
FIG. 4A is a schematic diagram illustrating a high-speed positioning system according to another embodiment of the present invention.
Figure 4B:
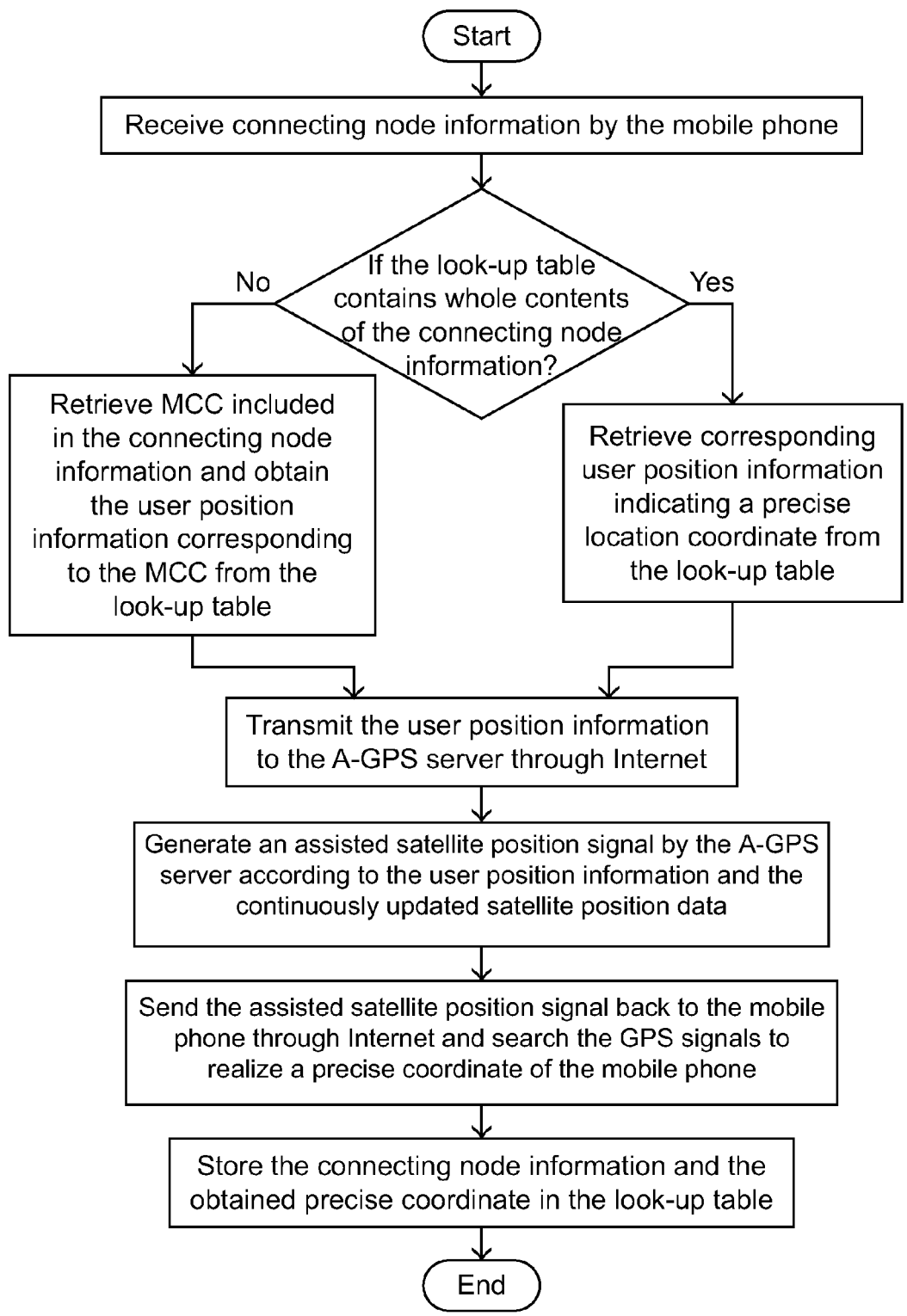
FIG. 4B is a flowchart illustrating a positioning method for use in the high-speed positioning system of FIG. 4A.

In a more-detailed embodiment, the connecting node 301 and positioning device 39 of the high-speed positioning system of FIG. 3 are implemented with a mobile phone communication system, as illustrated in FIG. 4A. In this embodiment, the connecting node is a base station 401 of the mobile phone communication system and the positioning device is a mobile phone 49 with GPS positioning capability. The network connecting module 490 is a wireless network connecting module and the user position information generator is a look-up table 491. A positioning method of the high-speed positioning system of FIG. 4A is summarized in the flowchart of FIG. 4B.

After the mobile phone 49 is turned on so as to communicate with the base station 401, the connecting node information is transmitted from the base station 401 to the mobile phone 49. Exemplary connecting node information includes but is not limited to mobile country code (MCC), mobile network code (MNC), cell identity and the like. According to the connecting node information, corresponding user position information is acquired from the look-up table 491 of the mobile phone 49, which has previously stored therein mobile country code and corresponding user position information (e.g. GPS coordinates). For example, if the mobile country code of Taiwan is stored in the look-up table 491, the corresponding user position information indicates a representative GPS coordinate of Taiwan (e.g. a coordinate of the Taiwanese geographical center). Whereas, if the mobile country code of United Kingdom is stored in the look-up table 491, the corresponding user position information indicates a representative GPS coordinate of United Kingdom (e.g. a coordinate of the London Airport).

If the look-up table 491 contains the whole contents of the connecting node information, corresponding user position information indicating a precise location coordinate is retrieved from the look-up table 491. If the look-up table 491 contains partial contents of the connecting node information, the mobile country code (MCC) included in the connecting node information is retrieved and the user position information corresponding to the mobile country code (MCC) is obtained from the look-up table 491. For example, if the subscriber of the mobile phone 49 is roaming in United Kingdom for the first time, the look-up table 491 built-in the mobile phone 49 generally does not have all the contents of required connecting node information. In other words, only partial connecting node information can be acquired after the mobile phone 49 is turned on and communicates with the local base station. Generally, a mobile country code can be acquired, and thus previously stored user position information associated with the mobile country code, e.g. a coordinate of the London Airport, can be obtained. By linking a mobile phone network containing the base station 401 to Internet 40, the wireless network connecting module 490 of the mobile phone 49 utilizes Transmission Control Protocol/Internet Protocol to transmit the coordinate of the London Airport to the AGPS server 31 through Internet 40. According to the coordinate of the London Airport and the continuously updated satellite position data (e.g. almanac and ephemeris data), the AGPS server 31 generates an assisted satellite position signal. The assisted satellite position signal is afterwards outputted to be transmitted to the satellite positioning module 492 of the mobile phone 49 through Internet 40 and the base station 401. According to the contents of the assisted satellite position signal, the mobile phone 49 searches currently available GPS satellites to achieve the object of high-speed positioning. Meanwhile, a precise coordinate of the location of the mobile phone 49 is obtained. Optionally but desirably, the connecting node information associated with the base station of the London Airport and the precisely located coordinate can be stored in the look-up table 491 of the mobile phone 49 as long as the look-up table 491 has sufficient memory space for storage.

Since the look-up table 491 of the mobile phone 49 has now recorded therein the connecting node information associated with the base station of the London Airport and the previously located coordinate, the mobile phone 49, when rebooted, is able to quickly retrieve the previously located coordinate corresponding to the connecting node information from the look-up table 491 as the user position information. Via Internet 40, the user position information is transmitted to the AGPS server 31. According to the user position information and the continuously updated almanac and ephemeris data, the AGPS server 31 generates and sends an assisted satellite position signal back to the satellite positioning module 492 of the mobile phone 49 through Internet 40 and the base station 401. According to the contents of the assisted satellite position signal, the mobile phone 49 searches the currently available GPS satellites to achieve the objects of the high-speed positioning. The newly located coordinate and updated connecting node information can be stored into the look-up table 491. Once the look-up table 491 is fully occupied, the new data overwrites previously stored data in time sequence.

Figure 5A:
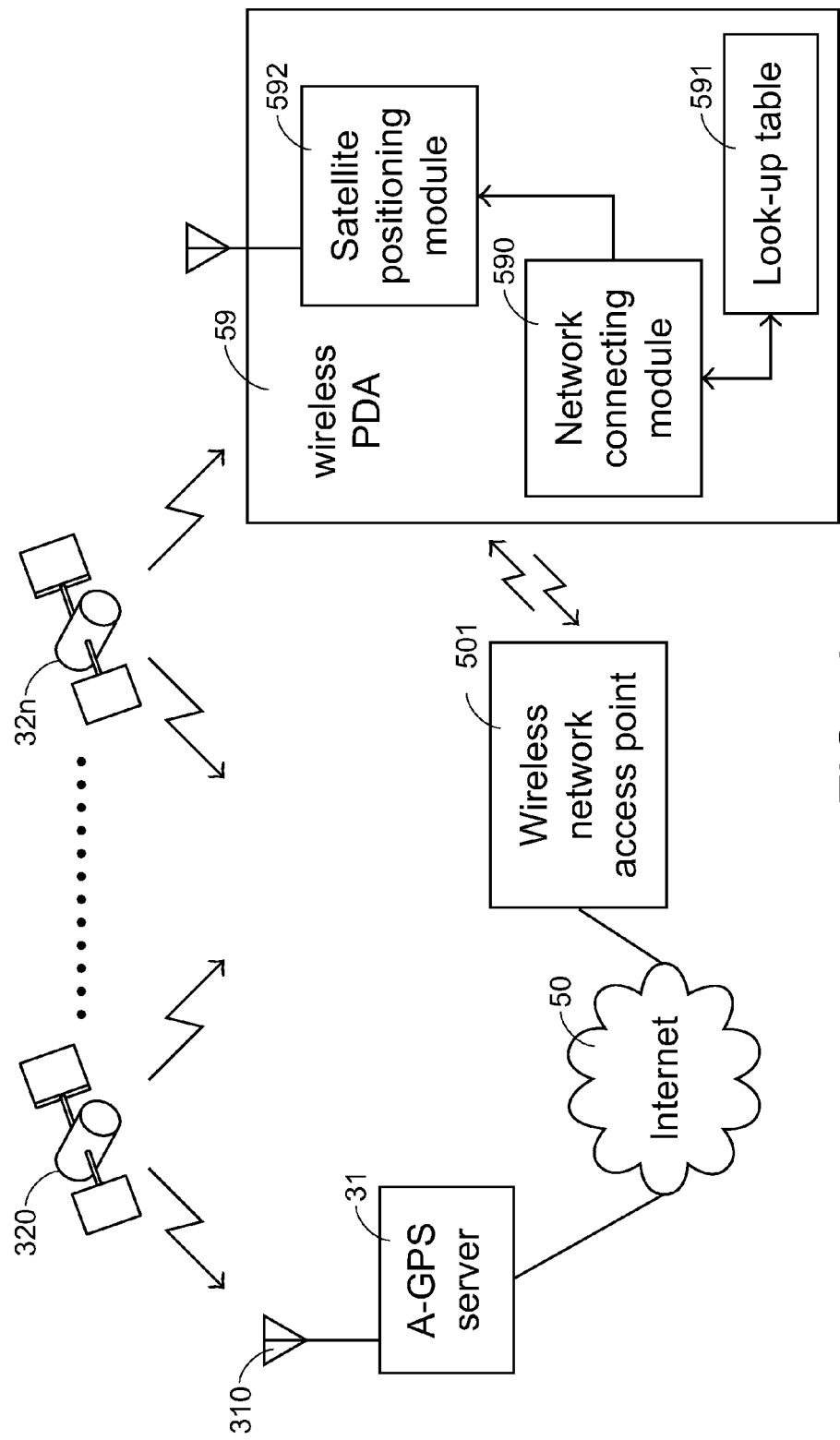
FIG. 5A is a schematic diagram illustrating a high-speed positioning system according to a further embodiment of the present invention.
Figure 5B:
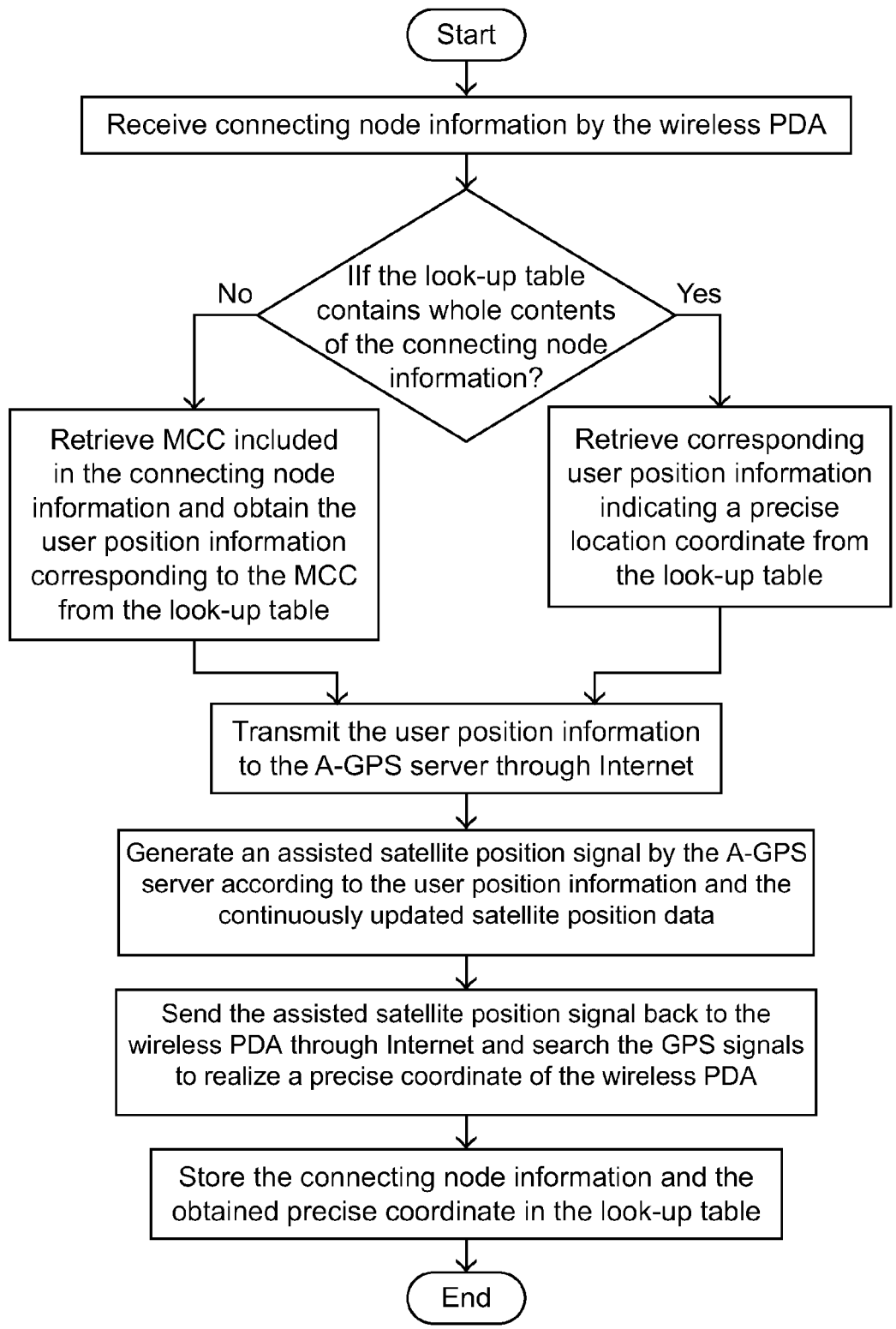
FIG. 5B is a flowchart illustrating a positioning method for use in the high-speed positioning system of FIG. 5A.

FIG. 5A illustrates another detailed embodiment of the high-speed positioning system, wherein the connecting node 301 and positioning device 39 of the high-speed positioning system of FIG. 3 are implemented with a mobile phone communication system are implemented with a wireless personal digital assistant (PDA) system. In this embodiment, the connecting node is a wireless network access point 501 and the positioning device is a wireless personal digital assistant (PDA) 59 with GPS positioning capability. After the wireless PDA 59 is turned on so as to communicate with the network access point 501, the connecting node information is transmitted from the network access point 501 to the wireless PDA 59. According to the connecting node information, corresponding user position information is obtained from the look-up table 591 of the wireless PDA 59. A positioning method of the high-speed positioning system of FIG. 5A is summarized in the flowchart of FIG. 5B.

After the wireless PDA 59 is turned on so as to communicate with the local network access point 501, the connecting node information is transmitted from the local network access point 501 to the wireless PDA 59. According to the connecting node information, corresponding user position information is acquired from the look-up table 591 of the wireless PDA 59, which has previously stored therein mobile country code and corresponding user position information (e.g. GPS coordinates). For example, if the mobile country code of Taiwan is stored in the look-up table 591, the corresponding user position information indicates a representative GPS coordinate of Taiwan (e.g. a coordinate of the Taiwanese geographical center). Whereas, if the mobile country code of Japan is stored in the look-up table 591, the corresponding user position information indicates a representative GPS coordinate of Japan (e.g. a coordinate of the Tokyo Narita Airport).

If the look-up table 591 contains the whole contents of the connecting node information, corresponding user position information indicating a precise location coordinate is retrieved from the look-up table 591. If the look-up table 591 contains partial contents of the connecting node information, the mobile country code (MCC) included in the connecting node information is retrieved and the user position information corresponding to the mobile country code (MCC) is obtained from the look-up table 591. For example, if the subscriber of the wireless PDA 59 is roaming in Japan for the first time, the look-up table 591 built-in the wireless PDA 59 generally does not have all the contents of required connecting node information. In other words, only partial connecting node information can be acquired after the wireless PDA 59 is turned on and communicates with the local network access point 501. Generally, a mobile country code can be acquired, and thus previously stored user position information associated with the mobile country code, e.g. a coordinate of the Tokyo Narita Airport, can be obtained. By linking a mobile phone network containing the local network access point 501 to Internet 50, the wireless network connecting module 590 of the wireless PDA 59 utilizes Transmission Control Protocol/Internet Protocol to transmit the coordinate of the Tokyo Narita Airport to the AGPS server 31 through Internet 50. According to the coordinate of the Tokyo Narita Airport and the continuously updated satellite position data (e.g. almanac and ephemeris data), the AGPS server 31 generates an assisted satellite position signal. The assisted satellite position signal is afterwards outputted to be transmitted to the satellite positioning module 592 of the wireless PDA 59 through Internet 50 and the local network access point 501. According to the contents of the assisted satellite position signal, the wireless PDA 59 searches currently available GPS satellites to achieve the object of high-speed positioning. Meanwhile, a precise coordinate of the location of the wireless PDA 59 is obtained. Optionally but desirably, the connecting node information associated with the local network access point 501 of the Tokyo Narita Airport and the precisely located coordinate can be stored in the look-up table 591 of the wireless PDA 59 as long as the look-up table 591 has sufficient memory space for storage.

Since the look-up table 591 of the wireless PDA 59 49 has now recorded therein the connecting node information associated with the local network access point 501 of the Tokyo Narita Airport and the previously located coordinate, the wireless PDA 59, when rebooted, is able to quickly retrieve the previously located coordinate corresponding to the connecting node information from the look-up table 591 as the user position information. Via Internet 50, the user position information is transmitted to the AGPS server 31. According to the user position information and the continuously updated almanac and ephemeris data, the AGPS server 31 generates and sends an assisted satellite position signal back to the satellite positioning module 592 of the wireless PDA 59 through Internet 50 and the local network access point 501. According to the contents of the assisted satellite position signal, the wireless PDA 59 searches the currently available GPS satellites to achieve the objects of the high-speed positioning. The newly located coordinate and updated connecting node information can be stored into the look-up table 591. Once the look-up table 591 is fully occupied, the new data overwrites previously stored data in time sequence.

Figure 6:
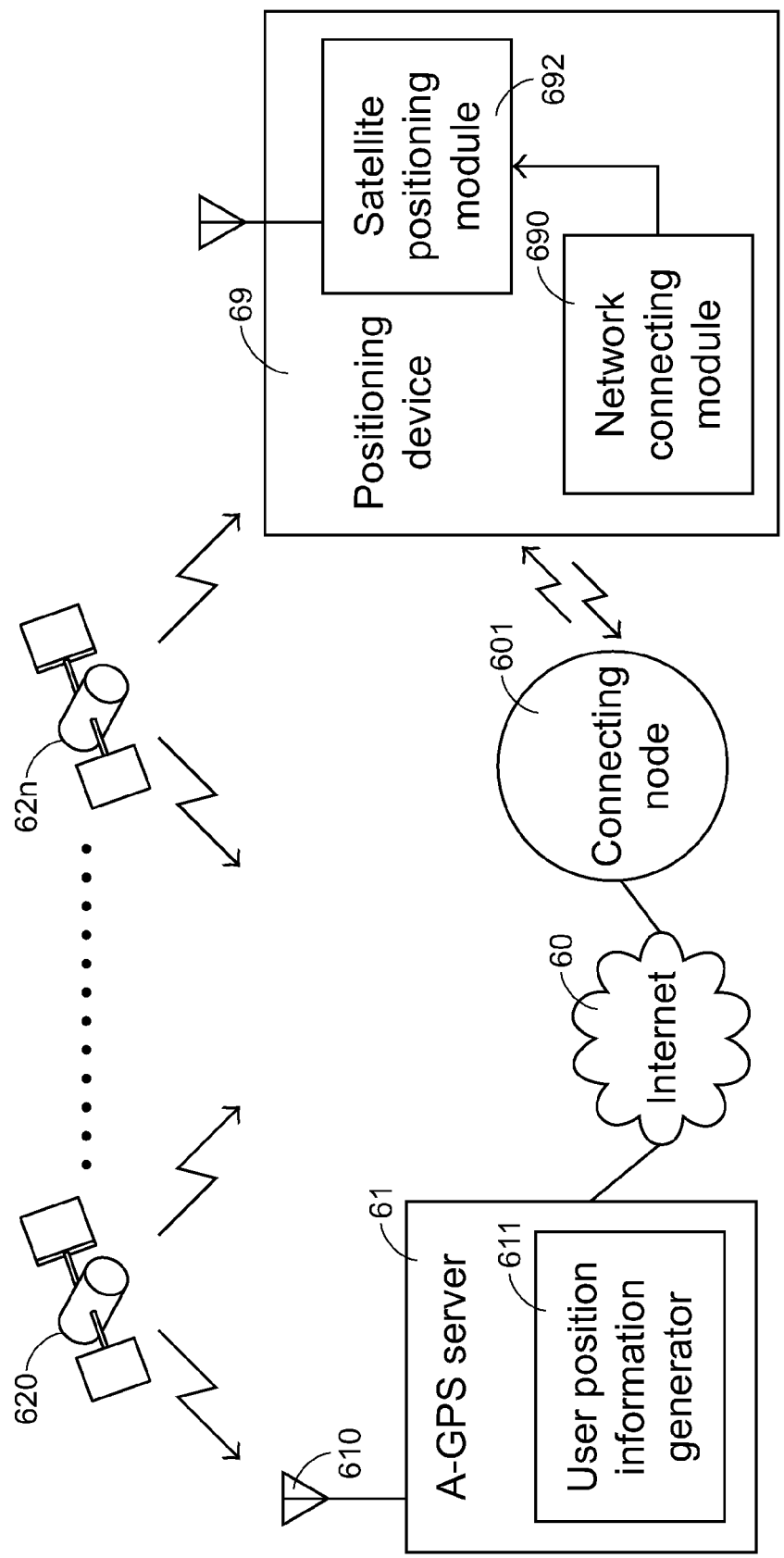
FIG. 6 is a schematic diagram illustrating a high-speed positioning system according to a yet further embodiment of the present invention.

FIG. 6 illustrates another embodiment of high-speed positioning system according to the present invention. The satellites 620~62n, Internet 60 and the connecting node 601 included in FIG. 6 are similar to those shown in FIG. 3, and are not redundantly described herein. In comparison with the system of FIG. 3, the positioning device 69 has no user position information generator. Whereas, a user position information generator 611 is included in the AGPS server 61. While the wireless network connecting module 690 of the positioning device 69 is coupled to the connecting node 601 of Internet 60, the positioning device 69 obtains the connecting node information associated with the connecting node 601 and transmits the connecting node information to the AGPS server 61 through Internet 60. According to the connecting node information, corresponding user position information is generated by the user position information generator 611 disposed in the AGPS server 61. According to the user position information and the continuously updated satellite position data (e.g. almanac and ephemeris data), the AGPS server 61 generates an assisted satellite position signal which is transmitted to the positioning device 69 for searching currently available GPS satellites so as to achieve the object of high-speed positioning.

Figure 7:
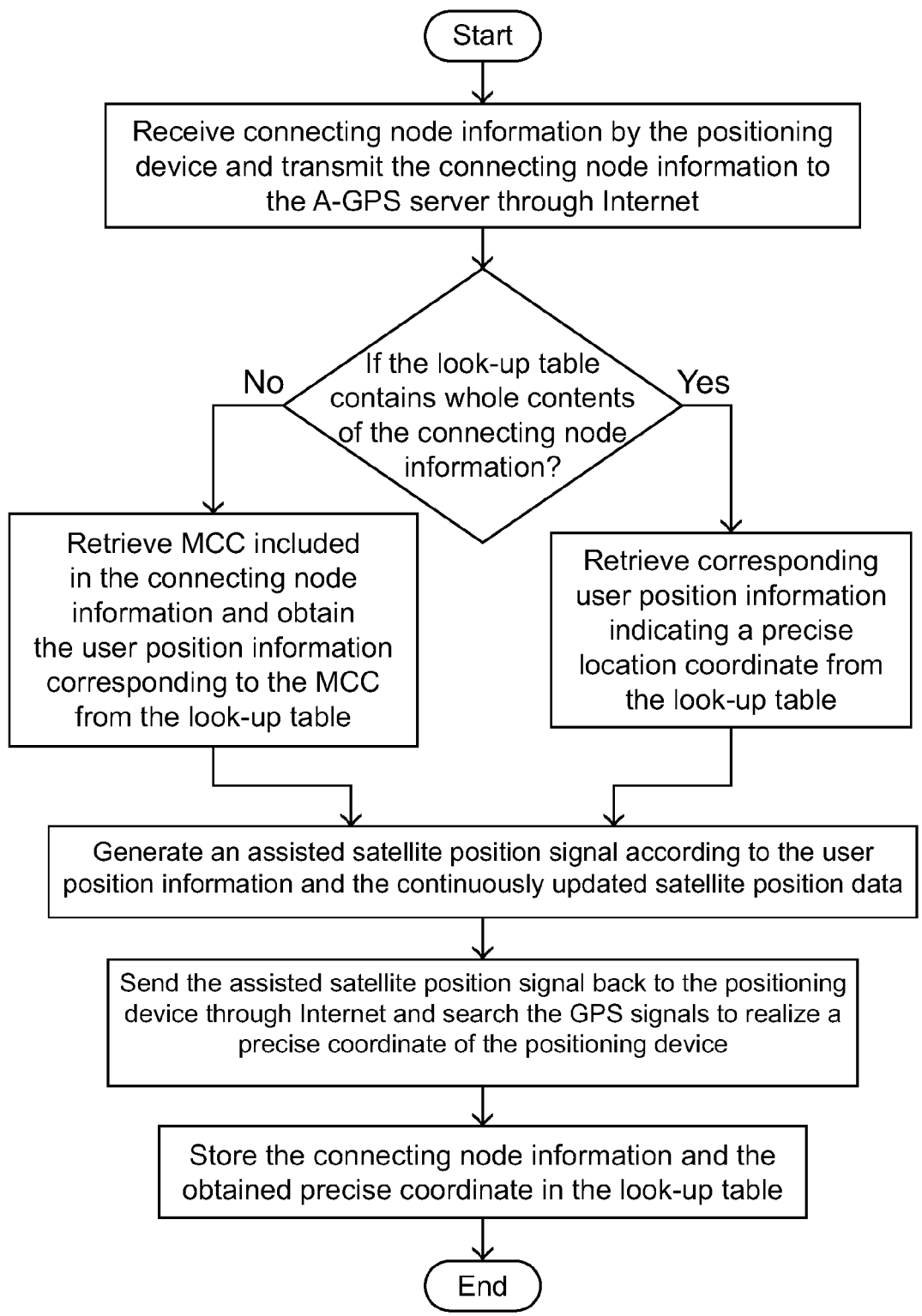
FIG. 7 is a flowchart illustrating a positioning method for use in the high-speed positioning system of FIG. 6.

An example of the positioning device 69 includes but is not limited to a mobile phone or a personal digital assistant with GPS positioning capability. If the positioning device 69 is a mobile phone, the connecting node 601 is a base station and the connecting node information can be the identity code of the base station. If the positioning device 69 is a personal digital assistant, the connecting node 601 is a wireless network access point and the connecting node information can be the identity code of the wireless network access point. In addition, the user position information generator 611 of the A-GPS server 61 can be a look-up table containing the identity code of the base station (or the wireless network access point) or the coordinate of the base station (or the wireless network access point). Since the user position information generator 611 is included in the AGPS server 61, the size of the look-up table may be relatively large compared to the one disposed in the positioning device. In addition, the look-up table can be periodically maintained and updated so as to further increase the searching speed and precision. If the look-up table does not contain all the contents of the required connecting node information, the mobile country code (MCC) included in the connecting node information is retrieved to obtain an estimated coordinate corresponding to the mobile country code (MCC), thereby quickly searching the currently available GPS satellites. The positioning method is summarized in FIG. 7.

It is understood from the above description that the positioning system of the present invention does not need assistance from any mobile phone service operators by linking the AGPS server to Internet. Accordingly, a carrier of the present positioning device can efficiently execute positioning functions in any place with the coverage of a mobile phone network.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A high-speed positioning system, comprising:
a server linking to Internet for receiving and interpreting GPS signals received from a satellite system; and
a positioning device comprising:
a network connecting module in communication with a connecting node of Internet for receiving a connecting node information;
a user position information generator in communication with the network connecting module for generating a user position information according to the connecting node information, wherein the user position information generator is a look-up table storing therein mobile country code and corresponding user position information, and the user position information is a location's coordinate, the user position information is transmitted to the server through Internet, and an assisted satellite position signal is generated by the server according to the user position information and sent back to the user position information generator through Internet; and
a satellite positioning module in communication with the network connecting module for receiving the assisted satellite position signal and executing a positioning operation according to the contents of the assisted satellite position signal;
wherein the user position information corresponding to the connecting node information is retrieved from the look-up table if the look-up table contains the whole contents of the connecting node information, and the user position information corresponding to the mobile country code is retrieved from the look-up table if the look-up table contains partial contents of the connecting node information;
wherein when the look-up table contains partial contents of the connecting node information, the look-up table is updated and wherein the look-up table is updated by storing therein the connecting node information together with a precise coordinate of the location of the positioning device obtained by the satellite positioning module that executes the positioning operation according to the contents of the assisted satellite position signal.

2. The high-speed positioning system according to claim 1, wherein the server is an assisted GPS (AGPS) server.

3. The high-speed positioning system according to claim 1, wherein the positioning device is a mobile phone and the connecting node information is the identity code of a base station.

4. The high-speed positioning system according to claim 1, wherein the positioning device is a personal digital assistant and the connecting node information is the identity code of a wireless network access point.

5. A high-speed positioning system, comprising:
a server linking to Internet for receiving and interpreting GPS signals received from a satellite system, a user position information generator being disposed in the server; and
a positioning device comprising:
a network connecting module in communication with a connecting node of Internet for receiving a connecting node information, wherein the connecting node information is transmitted to the server through Internet, according to the connecting node information, corresponding user position information being generated by the user position information generator, and an assisted satellite position signal is generated from the server according to the connecting node information, wherein the user position information generator is a look-up table storing therein mobile country code and corresponding user position information, and the user position information is a location's coordinate; and
a satellite positioning module in communication with the network connecting module for receiving the assisted satellite position signal and executing a positioning operation according to the contents of the assisted satellite position signal;
wherein the user position information corresponding to the connecting node information is retrieved from the look-up table if the look-up table contains the whole contents of the connecting node information, and the user position information corresponding to the mobile country code is retrieved from the look-up table if the look-up table contains partial contents of the connecting node information;
wherein when the look-up table contains partial contents of the connecting node information, the look-up table is updated and wherein the look-up table is updated by storing therein the connecting node information together with a precise coordinate of the location of the positioning device obtained by the satellite positioning module that executes the positioning operation according to the contents of the assisted satellite position signal.

6. The high-speed positioning system according to claim 5, wherein the server is an assisted GPS (A-GPS) server including the user position information generator.

7. The high-speed positioning system according to claim 5, wherein the positioning device is a mobile phone and the connecting node information is the identity code of a base station.

8. The high-speed positioning system according to claim 5, wherein the positioning device is a personal digital assistant and the connecting node information is the identity code of a wireless network access point.

9. A high-speed positioning method, comprising steps of:
allowing a server to receive and interpret GPS signals received from a satellite system;
allowing a positioning device to communicate with Internet through a connecting node to receive connecting node information;
allowing a user position information generator to generate user position information according to the connecting node information, wherein the user position information generator is a look-up table storing therein mobile country code and corresponding user position information, and the user position information is a location's coordinate, the user position information corresponding to the connecting node information is retrieved from the look-up table if the look-up table contains the whole contents of the connecting node information, and the user position information corresponding to the mobile country code is retrieved from the look-up table if the look-up table contains partial contents of the connecting node information;
generating an assisted satellite position signal from the server according to the user position information;
receiving the assisted satellite position signal by the positioning device and executing a positioning operation according to the contents of the assisted satellite position signal; and
updating the look-up table when the look-up table contains partial contents of the connecting node information by storing in the look-up table, the connecting node information together with a precise coordinate of the location of the positioning device obtained by executing the positioning operation according to the contents of the assisted satellite position signal.

10. The high-speed positioning method according to claim 9, wherein the connecting node information is transmitted to the server through Internet and the user position information is generated from the server.

11. The high-speed positioning method according to claim 9, wherein the server is an assisted GPS (A-GPS) server.

12. The high-speed positioning method according to claim 9, wherein the positioning device is a mobile phone and the connecting node information is the identity code of a base station.

13. The high-speed positioning method according to claim 9, wherein the positioning device is a personal digital assistant and the connecting node information is the identity code of a wireless network access point.

* * * * *